(12) United States Patent
Gordon et al.

(10) Patent No.: US 9,148,741 B2
(45) Date of Patent: Sep. 29, 2015

(54) ACTION GENERATION BASED ON VOICE DATA

(75) Inventors: Clif Gordon, Seattle, WA (US); Kerry D. Woolsey, Duvall, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 272 days.

(21) Appl. No.: 13/310,962

(22) Filed: Dec. 5, 2011

(65) Prior Publication Data

US 2013/0144610 A1    Jun. 6, 2013

(51) Int. Cl.
*H04W 4/00* (2009.01)
*G10L 15/30* (2013.01)
*H04W 4/18* (2009.01)

(52) U.S. Cl.
CPC .. *H04W 4/00* (2013.01); *H04W 4/18* (2013.01)

(58) Field of Classification Search
CPC ...................................................... H04W 4/00
USPC ................................................ 704/275, 201
See application file for complete search history.

(56) References Cited

U.S. PATENT DOCUMENTS

| | | | |
|---|---|---|---|
| 6,763,226 B1 * | 7/2004 | McZeal, Jr. .................. | 455/90.2 |
| 7,020,841 B2 * | 3/2006 | Dantzig et al. ................ | 715/727 |
| 7,184,539 B2 | 2/2007 | Colson et al. | |
| 7,421,468 B2 * | 9/2008 | Lunenfeld ..................... | 709/203 |
| 7,457,396 B2 | 11/2008 | Claudatos et al. | |
| 7,490,091 B2 * | 2/2009 | Lunenfeld ............................. | 1/1 |
| 7,882,122 B2 * | 2/2011 | Wong ............................. | 707/760 |
| 7,900,186 B2 * | 3/2011 | Lucassen et al. ............. | 717/104 |
| 8,213,970 B2 * | 7/2012 | Beyer ............................. | 455/466 |
| 8,246,060 B2 * | 8/2012 | Gottschalk et al. ......... | 280/93.51 |
| 8,248,237 B2 * | 8/2012 | Fitzgerald et al. ............ | 340/571 |
| 8,296,360 B2 * | 10/2012 | Polis et al. .................... | 709/203 |
| 8,301,108 B2 * | 10/2012 | Naboulsi ....................... | 455/345 |
| 8,412,845 B2 * | 4/2013 | Katis et al. .................... | 709/234 |
| 8,542,805 B2 * | 9/2013 | Agranovsky et al. ...... | 379/88.18 |
| 8,572,493 B2 * | 10/2013 | Qureshi ......................... | 715/742 |
| 8,594,641 B2 * | 11/2013 | Neilsen ......................... | 455/415 |
| 8,719,713 B2 * | 5/2014 | Esposito et al. .............. | 715/760 |
| 8,775,174 B2 * | 7/2014 | Conejero et al. ............. | 704/235 |
| 2004/0170258 A1 | 9/2004 | Levin et al. | |
| 2007/0019797 A1 | 1/2007 | Morris | |
| 2007/0297581 A1 | 12/2007 | Kuo et al. | |
| 2008/0215318 A1 | 9/2008 | Zhang et al. | |
| 2009/0326949 A1 * | 12/2009 | Douthitt et al. ............... | 704/260 |
| 2010/0080366 A1 | 4/2010 | Anglin et al. | |

OTHER PUBLICATIONS

"The Return on Investment of a Customer Interaction Network, with Speech Self-Service," Cisco Systems, Inc., 2004, 6 pages.

\* cited by examiner

*Primary Examiner* — Susan McFadden
(74) *Attorney, Agent, or Firm* — Bryan Webster; Kate Drakos; Micky Minhas

(57) ABSTRACT

An automated technique is discussed for processing audio data and generating one or more actions in response thereto. In particular embodiments, the audio data can be obtained during a phone conversation and post-call actions can be provided to the user with contextually relevant entry points for completion by an associated application. Audio transcription services available on a remote server can be leveraged. The entry points can be generated based on keyword recognition in the transcription and passed to the application in the form of parameters.

20 Claims, 10 Drawing Sheets

ACTION GENERATION BASED ON VOICE DATA

FIELD

The present application relates to voice data, and, particularly, to generating one or more actions based on voice data.

BACKGROUND

Mobile computing devices, such as smart phones, have become highly capable communication devices in recent years. In addition to the wide array of processing capabilities, such as word processing, mobile computing devices also typically include wireless communications capabilities to provide features, such as mobile telephony, mobile email access, web browsing, and content reception (e.g., video and radio). An increased number and type of services and information associated with mobile phones can be overwhelming and needs proper management. Sometimes a user of a telephone is not able to quickly or efficiently understand or retain the large volume of information received while using a mobile phone. For example, a person that is driving during a phone call might find it difficult to remember or take notes of follow-up action items, like adding an event to a calendar. When the opportunity arises, the person must manually enter the information into the mobile phone or computing device for later use or reference. Such inefficiencies can often lead to errors as remembering details of times and locations can be difficult.

Accordingly, there is a need to more efficiently assist the user with processing of information.

SUMMARY

The present application relates to an automated technique for processing audio (e.g., voice) data and generating one or more actions in response thereto. In particular embodiments, the audio data can be obtained during a phone conversation, and post-call actions can be provided to the user with contextually relevant entry points for completion by an associated application.

In one embodiment, audio transcription services available on a remote server can be leveraged, or, alternatively, local transcription services can be used. Automated entry points for an application can be generated based on keyword recognition in the transcription and passed to the application in the form of parameters.

In another embodiment, text data can be received that is audio data translated in real time. For example, a phone conversation can be monitored and converted into text data. Based on the text data, a list of possible actions can be generated. Words of the conversation can be used to generate typical actions. One or more actions can then be displayed in a list for ease of user viewing. User selection of an action can result in launching of the associated application.

In a simple example, a phone conversation could include time and date information, such as "see you tomorrow at 5 PM." This contextual information can be used to launch a calendar application while passing the relevant data for completing a calendar entry.

In an alternative embodiment, a user can send a voice command directly to a computing device. The voice command can be used to generate possible actions to take and can occur during a phone conversation. For example, a user can say "phone: appointment at 5 PM tomorrow" and a calendar application can be launched with the relevant data as parameters for completing the action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

Figure 1:
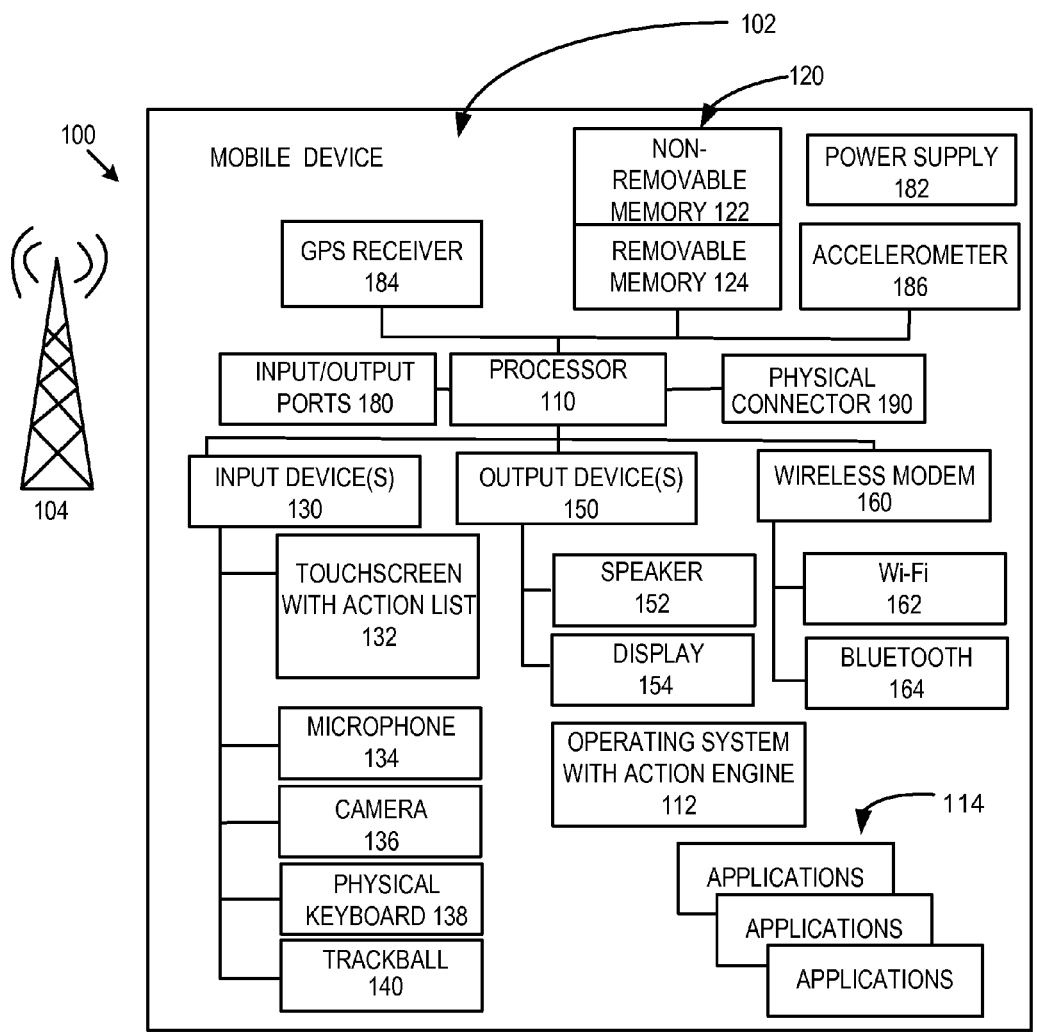
FIG. 1 is an example mobile phone that can be used for generating an action based on voice data.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The operating system 112 can include an action engine that can generate one or more actions to be carried out, as is further described below. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device. The touchscreen 132 can support an automated action list generated by the action engine within the operating system 112.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

Figure 2:
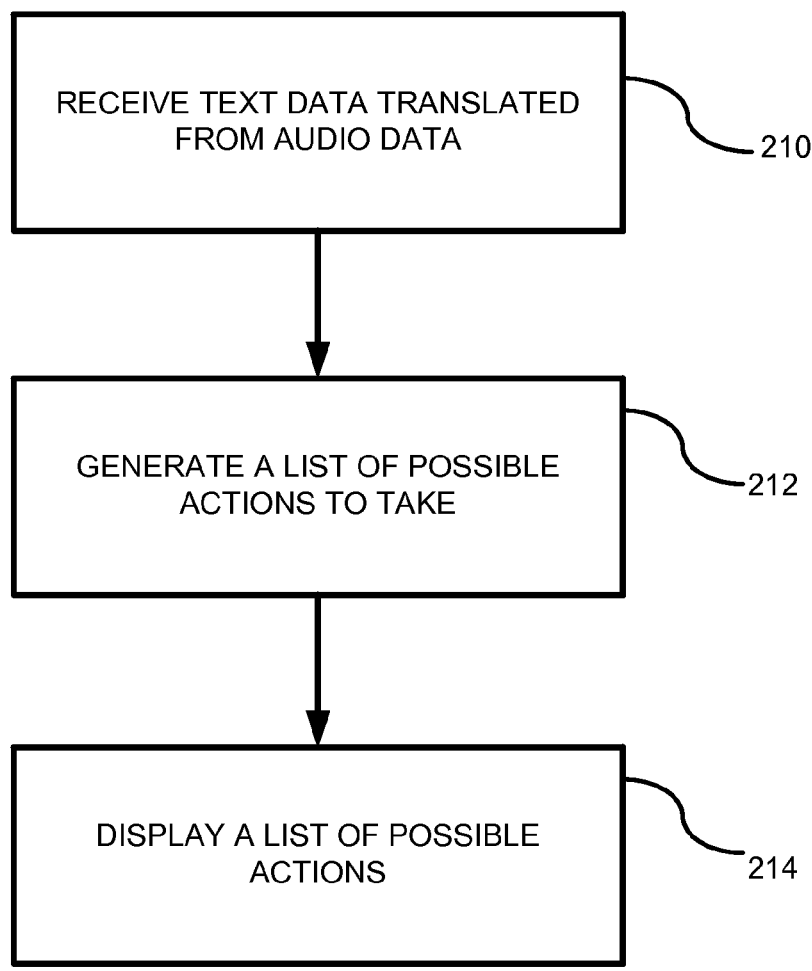
FIG. 2 is a flowchart of a method for generating actions based on translated audio data.

FIG. 2 is a flowchart of an embodiment for generating actions based on audio data. In process block 210, text data can be received that is translated from audio data. For example, during a phone conversation, audio data can be captured and translated in real time by sending (i.e., transmitting) the audio data to a network translator or translating such data locally. In any event, the text data is received from either the network or the local translation application. In process block 212, a list of possible actions to take can be generated. As described further below, keywords within the text data can be detected and used to determine the possible actions. In some embodiments, the text data can be passed to locally stored applications, which can parse the data and look for keywords of interest. Which key words are of interest depends on the particular application. For example, a movie application, such as Netflix®, can search for the keyword "movie" or "film", while a calendar application, such as Outlook®, can search for time and/or date information. If a keyword is found, the application can generate and return a suggested action item together with a confidence ranking, if desired. In process block 214, using the generated actions, a list of possible actions can be displayed. The list of possible actions can be displayed during the phone call or immediately following the phone call. If the user selects one of the actions, the associated application can be launched and the action completed by the application.

Figure 3:
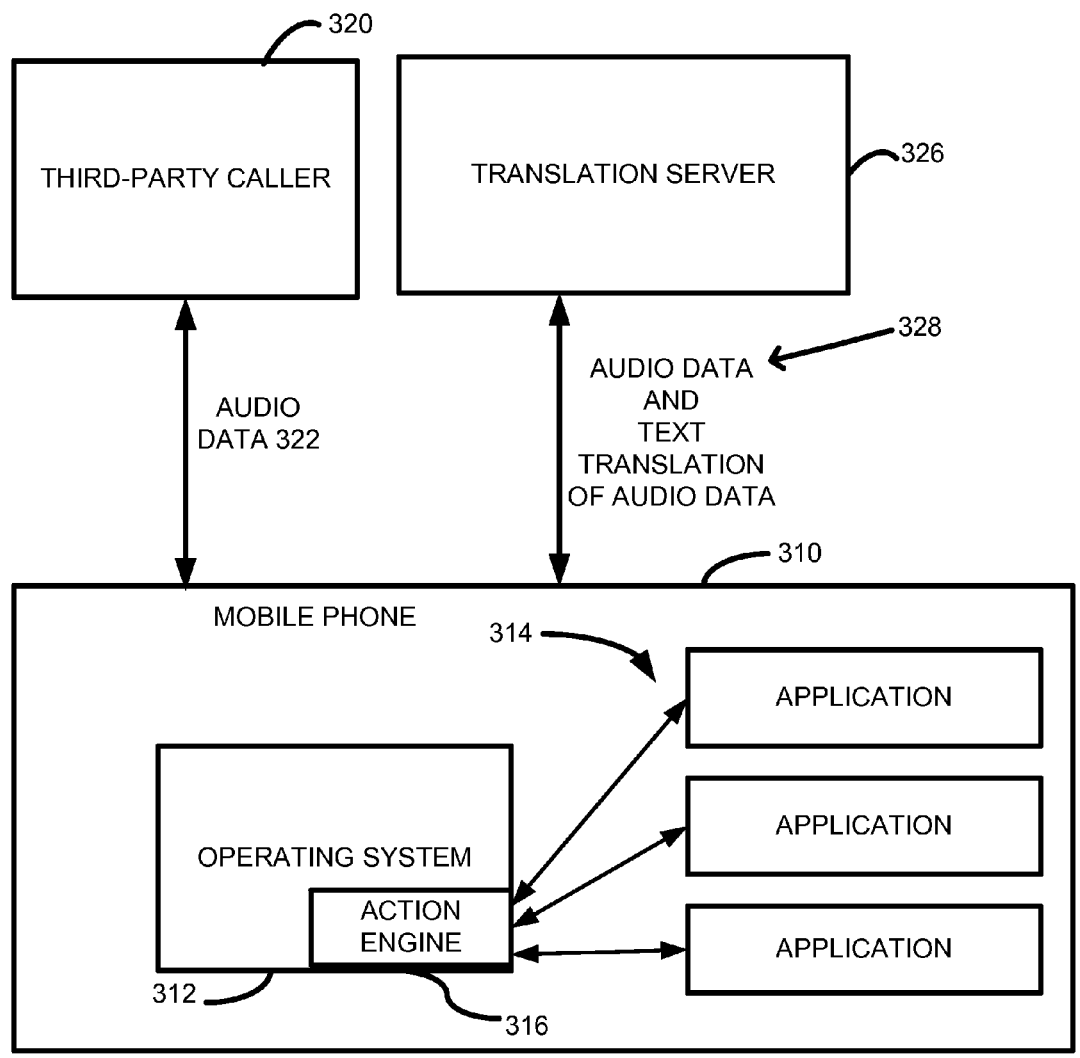
FIG. 3 is an embodiment of a system for generating one or more actions during a call.

FIG. 3 shows an embodiment of a system that can be used for generating actions based on voice data. In this example, a mobile phone 310 includes an operating system 312 and multiple applications shown at 314. Any of the applications can be third-party applications (such as movie applications, hotel applications, etc.) or applications tightly linked to the mobile phone (text messaging, email, etc.). Such tightly linked applications can be considered integrated into the operating system 312. The operating system 312 can include an action engine 316, which is responsible for generating actions in response to translated audio data. Alternatively, the action engine 316 can be a stand-alone application that is not part of the operating system. As a user speaks into the mobile phone, the user's voice is passed to a third-party caller 320 as audio data 322. Simultaneously, while the user is speaking, the mobile phone can have associated hardware or software for monitoring the user's conversation and passing the associated audio data in parallel to a third-party translation server 326. As shown at 328, in response to receiving the audio data, the translation server can pass back a text translation of the audio data to the mobile phone 310. Such translation services are already known in the art. The action engine 316 can receive the text translation and use the text translation to generate a list of possible actions to be displayed to the user.

Figure 4:
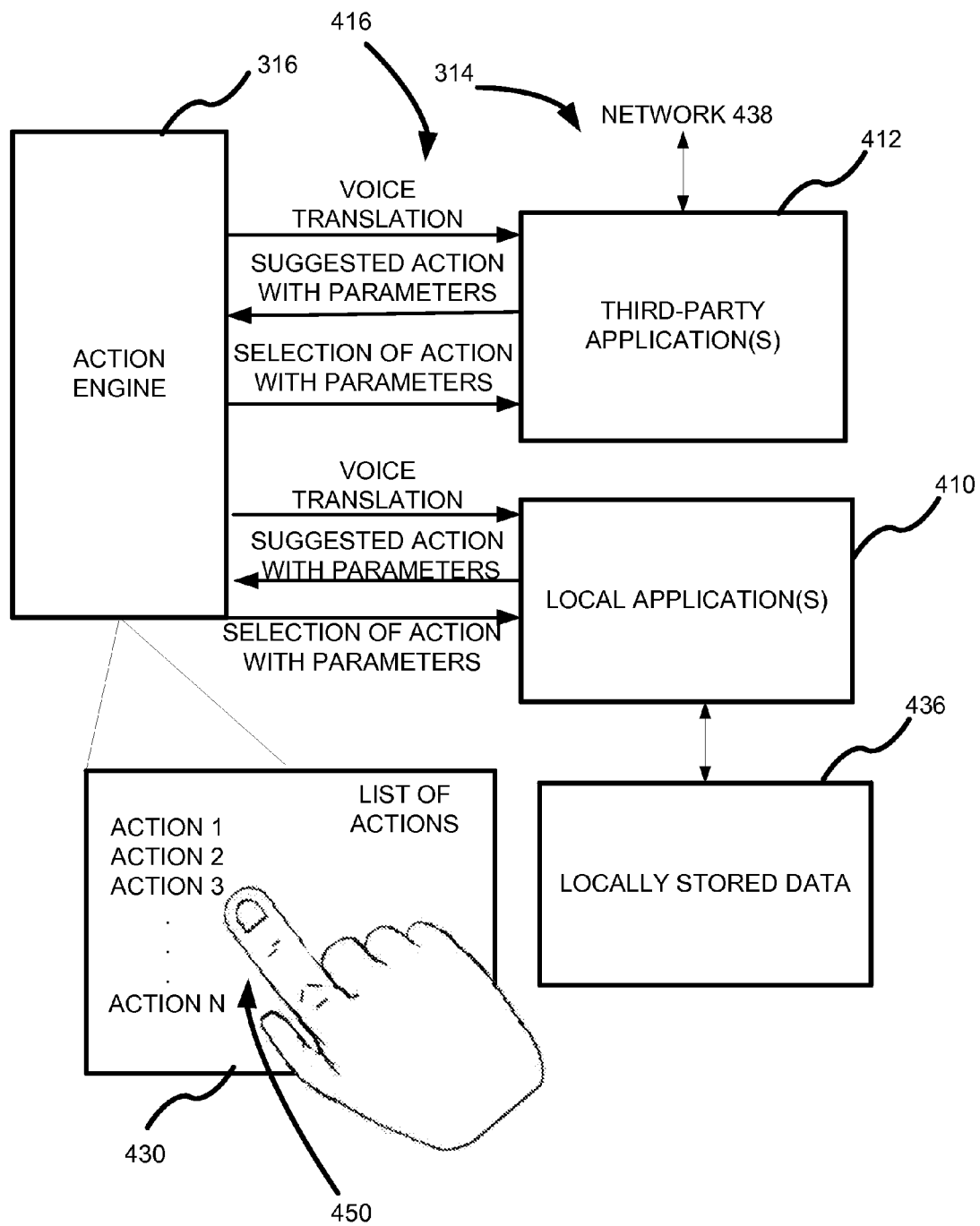
FIG. 4 is an embodiment showing a list of actions generated and a user selecting one of the actions.

FIG. 4 shows further details of the action engine's 316 interaction with the applications 314. The applications 314 can be a mixture of local applications 410 and third-party applications 412. Various communications can occur between the action engine 316 and the applications 314, as shown generally at 416. For example, the text data associated with the audio translation can be passed to the applications 314. The applications can then use their own algorithms for parsing the text data and searching for various keywords that are associated with the application. The applications can then pass back one or more suggested actions with parameters. A confidence ranking can also be passed back to the action engine 316. The confidence ranking is generated by the applications based on a level of certainty that the action is of interest. For example, some keywords, if found, provide a relatively high level of certainty that the action corresponds correctly to the conversation. An example can include dates and times as being highly relevant to a calendar application. Other confidence rankings depend on the particular algorithm used in the application. In response to the receipt of the suggested actions, the action engine 316 can generate a list of actions 430 for the user to view and select, if desired. The order of the list can be based on a ranking system, such as by using the confidence ranking or some other algorithm. As shown at 436, the local applications (or third-party applications) can use locally stored data to assist in generating the suggested actions. For example, if the phone number being used for the call corresponds to a contact in the user's contact list, the name of the contact can be passed as a parameter to the action engine. Additionally, a network 438 can be used by either the local applications or the third-party applications to assist in generating the suggested actions. For example, a third-party application can use the network to access network data that can be used in generating a suggested action. As a simple example, if a word "movie" is in the conversation and a title is provided, the network can be accessed to determine movie availability and location. Such parameters can then be used to generate a suggested action. If the user selects an action, as is shown generally at 450, the action and parameters can be used to launch the associated application. The parameters serve as entry points to allow the application to perform the action without user intervention. In a simple example, a time, date, and subject can be passed to a calendar application and such data can be added to the calendar.

Figure 5:
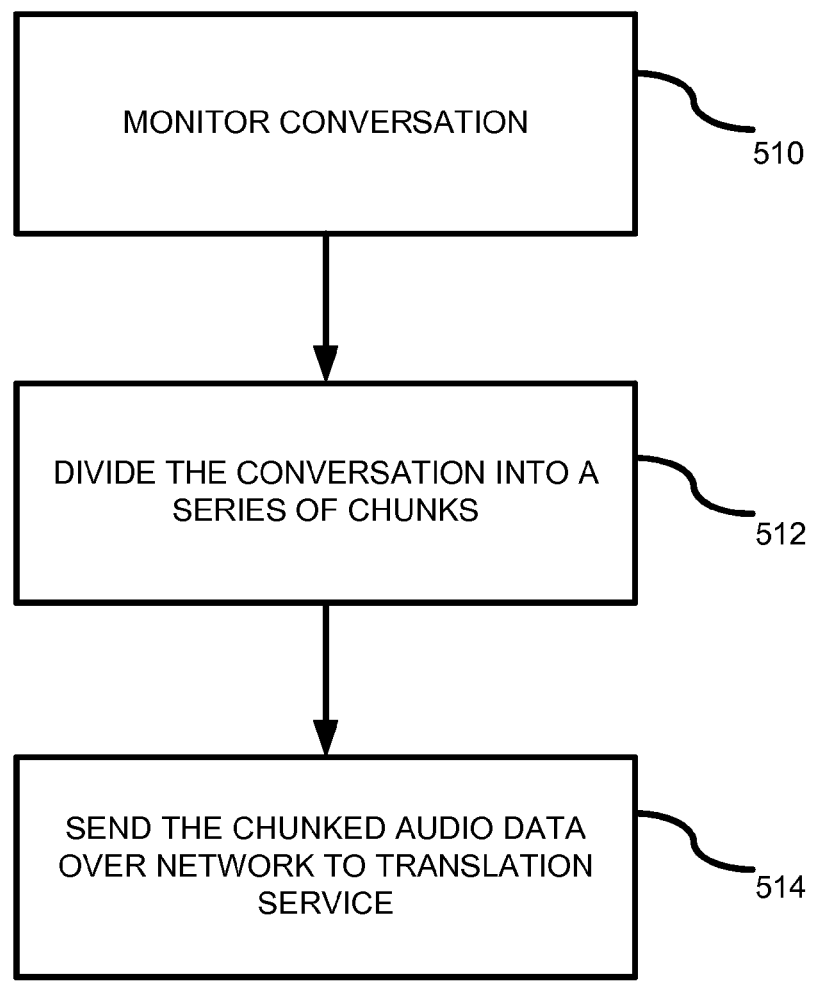
FIG. 5 is a flowchart of a method for automatically translating audio data.

FIG. 5 is a flowchart of a method showing additional process blocks that can be implemented. In process block 510, a phone conversation is monitored and the audio data can be buffered in a memory 120 (see FIG. 1). In process block 512, the audio data can be divided into predetermined chunk sizes, such as 5 second chunks. In process block 514, the chunked audio data can be sent over a network to a translation service. Thus, in real time while a phone conversation is occurring, the chunked data can be sent over a data connection to a translation server that can translate the audio data to text and return the text data to the action engine 340.

Figure 6:
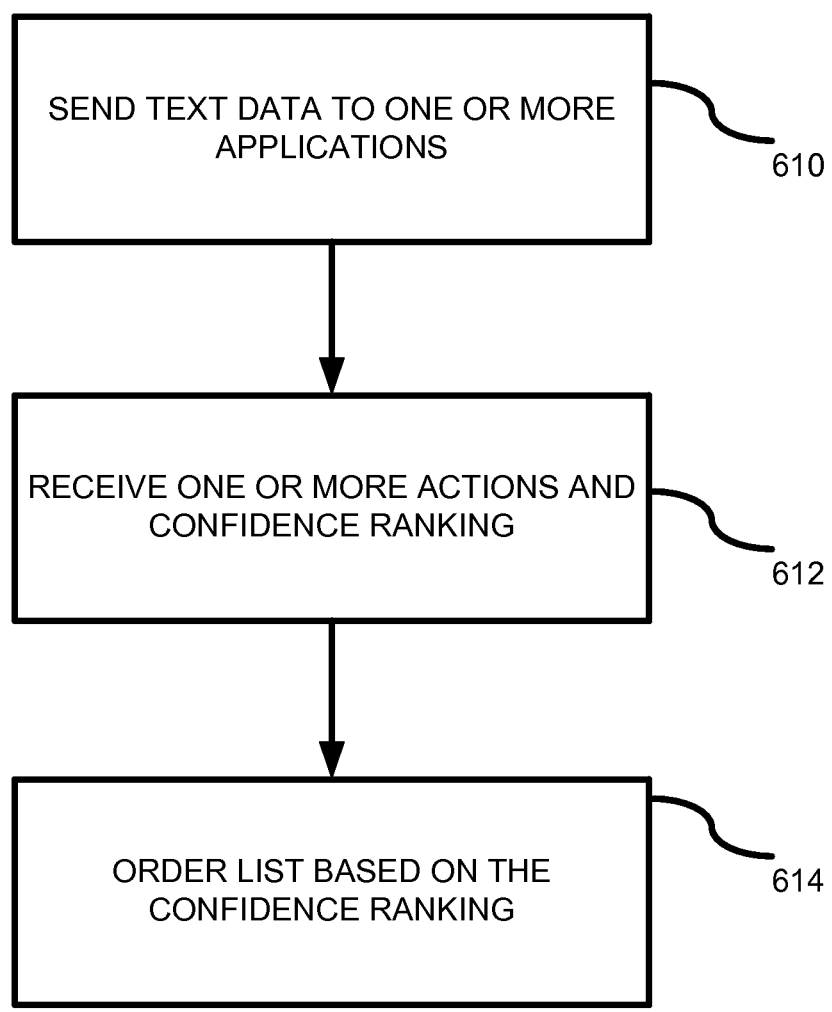
FIG. 6 is a flowchart of a method for sending translated audio data to at least one application and receiving an action in return.

FIG. 6 is a flowchart of a method showing further details of generating a list of possible actions, such as was described at process block 212 of FIG. 2. In process block 610, text data can be sent to one or more applications. As already described, the applications can be integrated into the operating system or stand-alone applications. The text data can be translated audio data captured through monitoring of a conversation. In process block 612, one or more potential actions can be received in conjunction with a confidence ranking. Alternatively, the confidence ranking need not be included. In process block 614, a list can be generated by ordering or sorting the list of actions. The confidence ranking can be used as a factor in determining the order.

Figure 7:
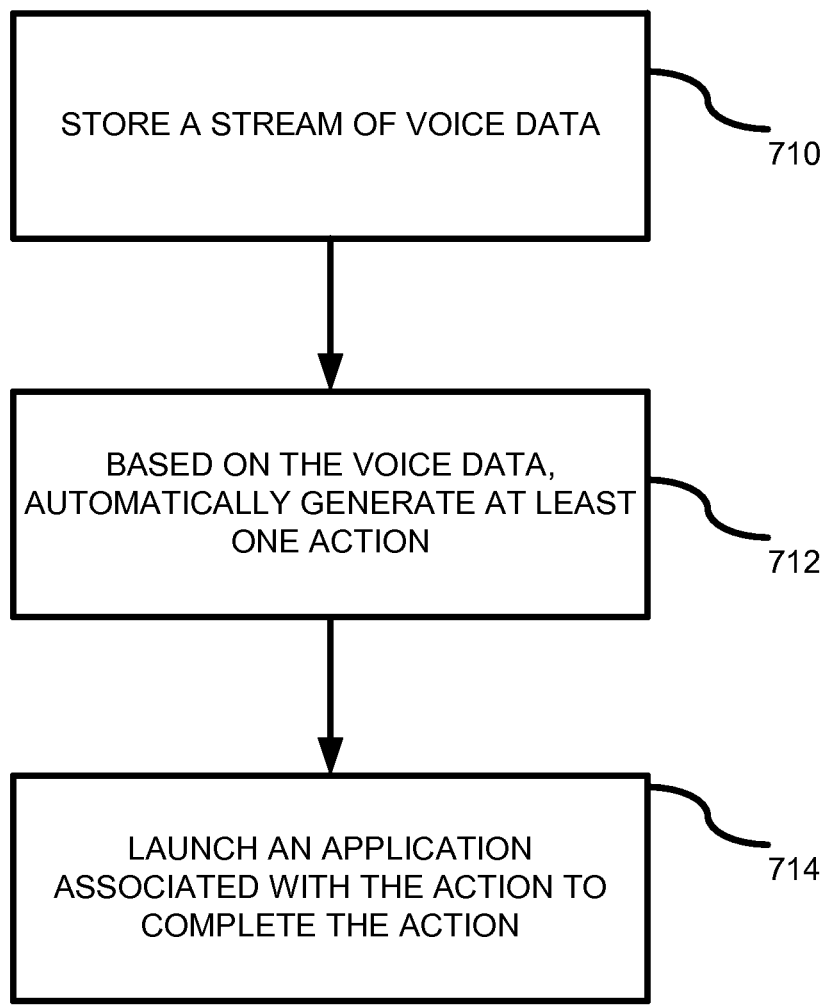
FIG. 7 is a flowchart of another embodiment for automatically launching an application using translated audio data.

FIG. 7 is a flowchart of a method for generating at least one action based on voice data. In process block 710, a stream of voice data is stored. In most embodiments, the stream of voice data is captured during a phone conversation. The stream of voice data can include a conversation with a third party, but can also include voice commands. For example, a user can issue commands during the conversation, such as "phone command: calendar tomorrow for 5 PM," wherein "phone command" is a predefined word sequence indicating that a command follows. In process block 712, based on the voice data, at least one action is automatically generated. Typically, the voice data is converted into text data and the text data is analyzed in order to generate the action. The voice data can be converted in real time by transmitting the voice data over a network while the voice data is being received. The action can be generated by the action engine itself or by applications in communication with the action engine. In process block 714, an application can be launched that is associated with the action so that the action can be completed. Launching the application typically includes passing the application parameters that represent an entry point so that the application can complete the requested action. The parameters are typically generated based on the voice data.

Figure 8:
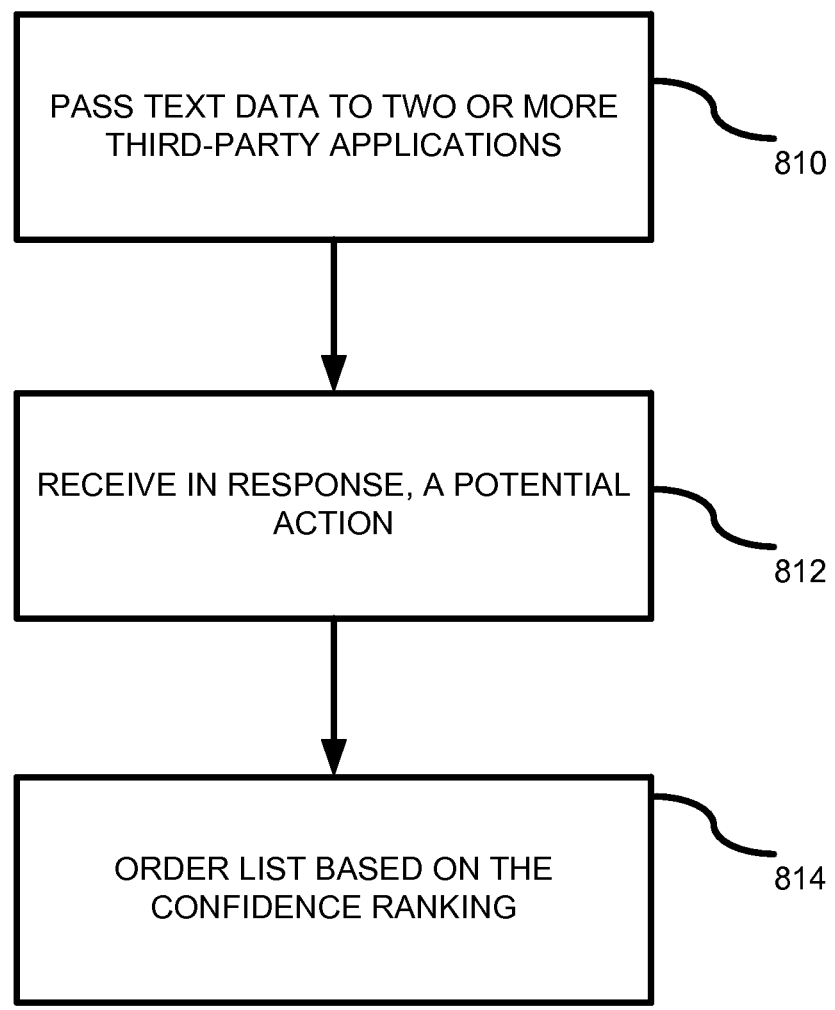
FIG. 8 is a flowchart of a method for generating a list of actions.

FIG. 8 is a flowchart of a method showing additional process blocks that can be used to implement process block 712 of FIG. 7. In process block 810, text data, which is translated from voice data, can be passed to two or more third-party applications. The third-party applications can parse the text data and search for predetermined keywords. In response to detection of a keyword, a response is generated by the two or more applications. In process block 812, at least one potential action is received. A confidence ranking can also be included with the potential action. In process block 814, a list of actions is ordered based on the confidence ranking. User input can then be solicited to select an action from the list to be completed.

Figure 9:
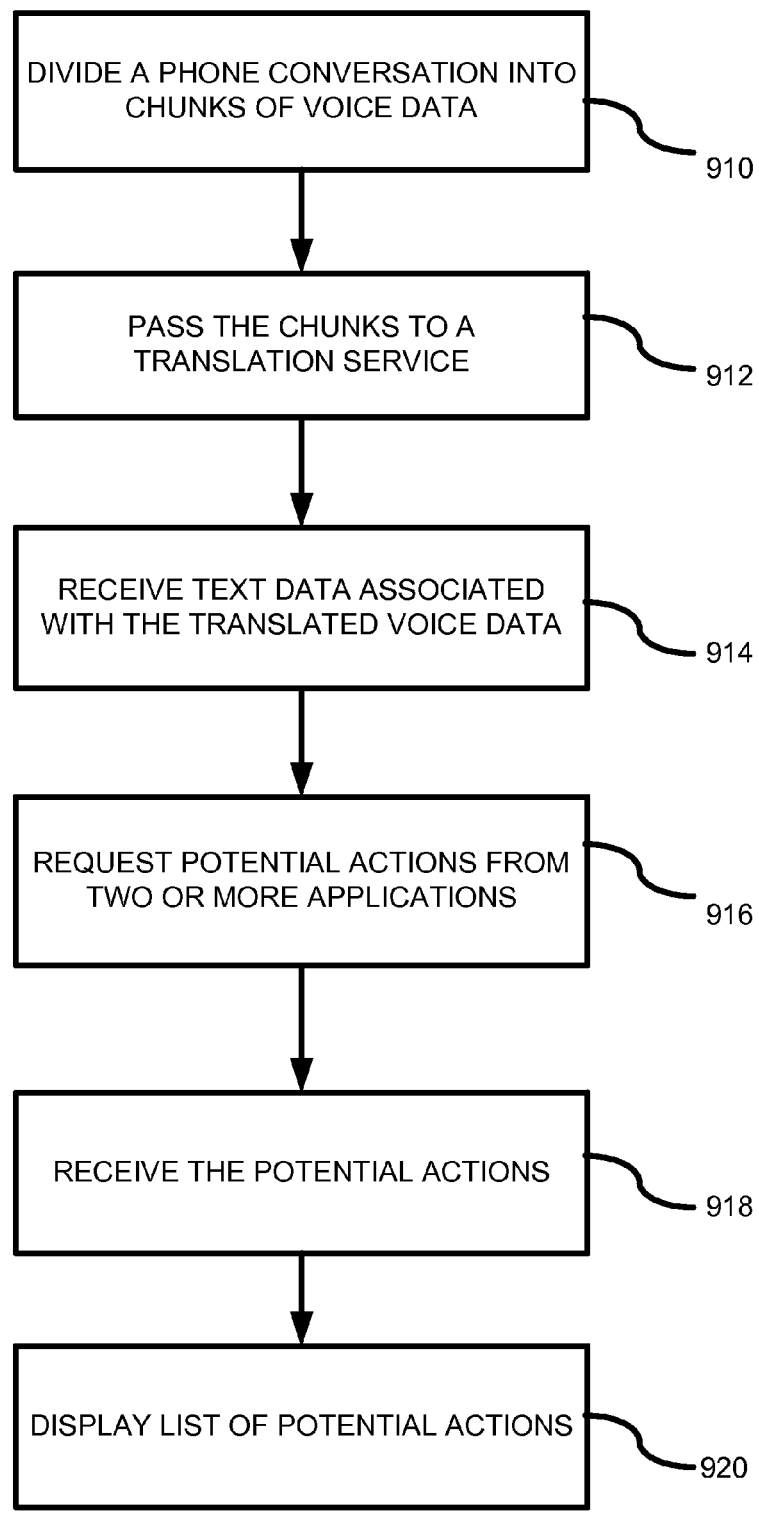
FIG. 9 is a detailed flowchart of an embodiment for automatically extracting information from a phone conversation and generating potential actions in response thereto.

FIG. 9 is a detailed flowchart of a method that can be used to generate actions based on voice data. In process block 910, a phone conversation is monitored and divided into chunks of voice data of a predetermined time duration (e.g., 5 to 15 second chunks). In process block 912, the chunks are passed to a translation service that converts audio data into text data. Passing the chunks to a translation service can include sending the chunks over a network to a server for translation. In process block 914, text data is received back from the translation service. In process block 916, two or more applications are requested whether potential actions exist for the translated text data. In process block 918, potential actions are returned from the applications. In process block 920, the potential actions are displayed to the user, such as in list format according to a priority.

Thus, existing voice transcription services can be leveraged to transcribe phone call audio. The text transcription of the audio can be retrieved from a speech server and analyzed for keywords related to actions to be presented to the user. The phone call audio can be routed through a transcription client (i.e., action engine) on the phone in real-time as the conversation is happening, and the audio can be sent in chunks (i.e., 10-15 second clips with 2 second overlaps) so transcription and analysis can be mostly complete by the time the phone conversation has completed. A sequence can include one or more of the following: 1) User initiates a phone call; 2) Device Chipset routes audio to the earpiece as well as to the transcription client; 3) transcription client on the device can send the first 15 seconds of conversation audio to the speech server for transcription; 4) transcription client on the device sends the next 15 second chunk, but ensures a 2-second overlap; this overlap is to reduce the frequency of missing a word because it was clipped at the end of the previous 15 second chunk; 5) Transcription Server asynchronously returns text transcriptions for each 15 second clip; 6) Transcription Client recreates full phone conversation text transcription and analyzes text for key phrases matching available actions; 7) the user completes the phone call; 8) the user is presented with a list of actions derived from the context of the phone conversation transcription; 9) the user chooses to perform any, all, or none of the presented options, then closes the phone user experience, ending the phone call experience.

Figure 10:
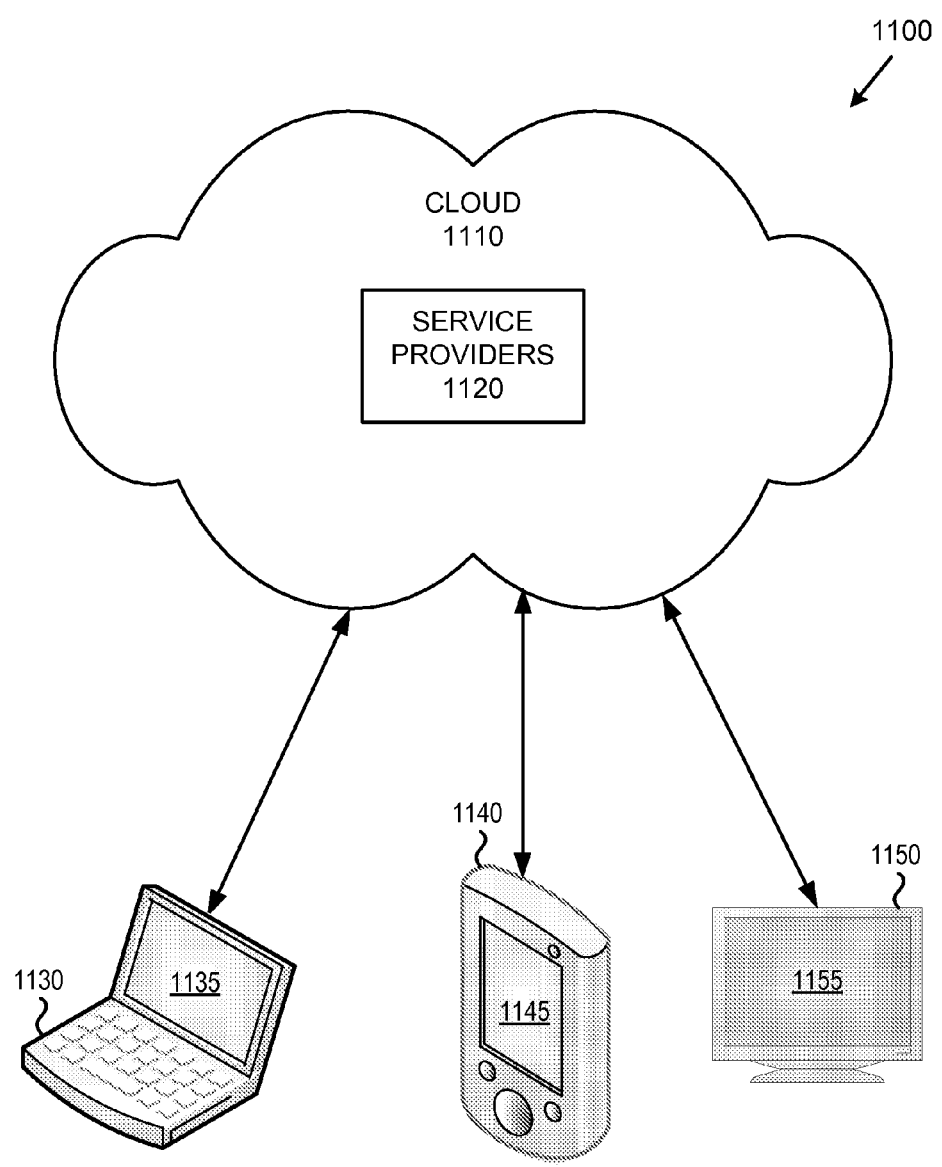
FIG. 10 is a system diagram showing how the methods described herein can be extended across different platforms.

FIG. 10 illustrates a generalized example of a suitable implementation environment 1100 in which described embodiments, techniques, and technologies may be implemented.

In example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network, such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer, such as desktop computer, laptop, notebook, netbook, or the like. Connected device 1140 represents a device with a mobile device screen 1145 (e.g., a small size screen). For example, connected device 1140 could be a mobile phone, smartphone, personal digital assistant, tablet computer, or the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Phone conversations can occur on any of the devices 1130, 1140, 1150, so that the methods described herein can be applied on any of these devices. Additionally, stored data can be shared across the devices in order to generate actions.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method for generating an action based on a conversation on a mobile device, comprising:

performing by the mobile device:
   receiving audio data on the mobile device;
   receiving text data on the mobile device, the text data generated in real time from the received audio data;
   parsing the text data, wherein the parsing comprises searching for one or more predetermined keywords within the text data generated in real time on the mobile device;
   based on the parsed text data and the one or more predetermined keywords found during the searching, generating a list of possible actions to be performed by one or more applications running on the mobile device; and displaying the list of possible actions on the mobile device.

2. The method of claim 1, wherein the mobile device is a mobile phone.

3. The method of claim 1, further including transmitting the audio data over a network for translation.

4. The method of claim 1, further including monitoring the conversation, dividing the conversation into a series of data chunks of a predetermined time duration, and transmitting the data chunks over a network for translation.

5. The method of claim 1, wherein generating the list includes sending the text data to an application and receiving in response thereto, one or more actions and associated confidence ranking associated with each action, and further including ordering the actions based on the confidence ranking.

6. The method of claim 1, further including translating the conversation from audio to the text data in real time while the conversation is occurring.

7. The method of claim 6, wherein the translating occurs over a network or on the mobile device.

8. The method of claim 1, further including receiving a selection of an item on the list and, in response thereto, launching an application on the mobile device associated with the selected item.

9. The method of claim 8, further including passing the application parameters associated with the item on the list.

10. The method of claim 1, further including receiving a selection of an item on the list and, in response thereto, automatically adding a calendar item associated with the selected item.

11. A computer-readable storage device storing computer-executable instructions operable to cause a mobile computing device to perform a method comprising:
    storing a stream of voice data on the mobile computing device during a phone conversation, the phone conversation using the mobile computing device;
    based on the voice data, automatically generating at least one action based on parsing text data, the text data corresponding to the voice data, wherein the parsing comprises searching the text data for one or more keywords associated with an application running on the mobile computing device; and
    launching the application associated with the at least one action and the one or more keywords.

12. The computer-readable storage device of claim 11, wherein launching the application further includes passing parameters to the application, the parameters having been generated based on the voice data.

13. The computer-readable storage device of claim 11, wherein the method further includes translating the stream of voice data into the text data.

14. The computer-readable storage device of claim 13, wherein translating the stream of voice data includes transmitting the voice data over a network to be translated in real time while the voice data is being received and receiving back the translation into the text data.

15. The computer-readable storage device of claim 13, further including dividing the stream of voice data into chunks, and translating the chunks into the text data.

16. The computer-readable storage device of claim 11, wherein automatically generating at least one action includes:
    sending text data, which is a translated version of the stored voice data, to two or more third-party applications;
    receiving, in response to the sent text data, a potential action from two or more of the third-party applications; and
    generating a list of potential actions.

17. The computer-readable storage device of claim 16, wherein the mobile computing device is a phone and wherein the list of potential actions is generated during a phone conversation.

18. The computer-readable storage device of claim 11, further including using text data, which is a translated version of the stored voice data, in conjunction with locally stored parameters to generate the list of potential actions.

19. A method for generating a list of actions based on a phone conversation, comprising:
    performing by a mobile device:
        dividing the phone conversation into chunks of voice data of a predetermined duration;
        passing the chunks of voice data to a translation service;
        receiving, from the translation service, text data associated with the translated voice data;
        parsing the text data, wherein the parsing comprises searching the text data for at least one keyword associated with two or more applications running on the mobile computing device;
        requesting potential actions from the two or more applications based on the parsed text data;
        receiving the potential actions from the two or more applications; and
        displaying a list of the potential actions.

20. The method of claim 19, wherein passing the chunks of data to the translation service includes transmitting the chunks of voice data over a network to a server computer.

\* \* \* \* \*